UNITED STATES PATENT OFFICE.

JOHN KIRBY, MATHEW S. HOPKINS, AND CHARLES BAKER BERNHART, OF READING, PENNSYLVANIA.

PREPARATION OF LEAD ARSENATE.

1,398,267.        Specification of Letters Patent.      Patented Nov. 29, 1921.

No Drawing.     Application filed July 28, 1921. Serial No. 488,156.

*To all whom it may concern:*

Be it known that we, JOHN KIRBY, MATHEW S. HOPKINS, and CHARLES B. BERNHART, citizens of the United States, residing in Reading, county of Berks, and State of Pennsylvania, have invented certain new and useful Improvements in the Preparation of Lead Arsenate, of which the following is a full and complete specification.

It is well known that lead arsenate of commerce exists in two well defined forms, the acid arsenate and the pyroarsenate. The commercial variety is of recognized importance for use as an insecticide being sprayed upon the foliage of growing plants. As manufactured, the product may vary in its proportions of the two forms of arsenate dependent upon the quantities of the ingredients used and the conditions under which the manufacture is conducted.

It is well known that an arsenate of lead may be prepared by dissolving a salt of lead in water and adding to it a combining weight of arsenic acid. Alternatively litharge has been treated with an acid, preferably acetic, and the resulting lead salt precipitated with arsenic acid. While attempts have been made to produce the arsenate by the direct action of arsenic acid upon litharge, the results are not satisfactory commercially due mainly to the slowness of the reaction. Various means have been suggested to increase the speed of reaction by utilizing compounds or reagents operating in a cyclic or catalytic manner, for example the ordinary acids of industry, nitric, acetic, or the like. Such processes, however, are subject to the disadvantages resulting from the strength of these acids, the danger in handling them, difficulty and restrictions of their transportation and expenses of manufacture.

It is an object of this invention to employ in the preferred reaction a catalyzer which is cheap, safe in handling, readily transported and non-corrosive. We have discovered that the sulfonic acids of the aromatic hydrocarbons make excellent catalyzers, that they are inexpensive to manufacture since many are the by-products of other industries, and that they are readily transported in their usual liquid or solid form. Also the purity of the sulfonic acid used is relatively non-essential as a mixture of sulfonic acids obtained by the sulfonation of the commercial grades of these hydrocarbons will act effectively. In addition, the lead arsenate produced by the use of these reagents possesses in a marked degree the physical requirements important for an insecticide, namely, large bulk, good dispersion, proper adherence to the foliage treated and effective insecticidal properties.

One mode by which the above invention may be carried out consists in sulfonating a commercial grade of an aromatic hydrocarbon such as ordinary naphthalene in the usual manner, removing any excess of sulfuric acid by suitable means such as by precipitation with a lead salt. The clear liquid resulting after filtration or decantation consists of a mixture of various sulfonic acids of naphthalene and constitutes the catalyzer used in the process.

A charge of 700 pounds of litharge is placed in a tank and thoroughly agitated and kept in suspension in water. About 50 pounds of mixed sulfonic acids are then added, the quantity to be used depending upon the speed of reaction required and the physical properties desired in the product. About 600 pounds of arsenic acid (75% $H_3AsO_4$) is then slowly added with constant agitation. The temperature is raised to about 160° F. The mass gradually changes in color to white and the litharge is converted to lead arsenate having a small excess of litharge, which latter may be removed, if desired, by the addition of more arsenic acid. The resulting mass of lead arsenate, the lead salt of the sulfonic acid and water may then be washed by any of the usual methods and the lead arsenate pressed for use as pulp, or as powder after drying and grinding.

Precipitation of the lead arsenate will leave the sulfonic acid available for the treatment of a further quantity of litharge, already present in large excess, and so a small quantity of a sulfonic acid—much less than would be required to combine with all the litharge present—may be used in this cyclic or catalytic manner to convert a large quantity of litharge into lead arsenate.

It will be obvious that lead carbonate or basic lead carbonate may be used in place of litharge, that a soluble arsenate may be substituted for the acid and that the mixed mono or polysulfonic acids which are obtained by the sulfonation of benzene, anthracene, phenol, cresol, naphthol, anthraquinone, or naphthionic or anthranilic acid may likewise be used as catalyzers in place of the acids formed from naphthalene. The above reactions may be expressed, as follows, X representing a hydrocarbon compound of the aromatic series:

$$PbO + 2(XSO_3H) = Pb(SO_3X)_2 + H_2O$$

or, $$PbCO_3 + 2(XSO_3H) = Pb(SO_3X)_2 + H_2O + CO_2$$

$$Pb(SO_3X)_2 + H_3AsO_4 = PbHAsO_4 + 2XSO_3H$$

or, $$3Pb(SO_3X)_2 + 2H_3AsO_4 = Pb_3(AsO_4)_2 + 6XSO_3H$$

While we have described above one mode of carrying out our invention, it will be obvious that numerous changes may be made in the selection of analogous ingredients and in the exact proportions or steps above outlined without departing form the spirit of our invention, as defined in the following claims.

What we claim is:

1. The method of making lead arsenate which consists in treating an insoluble compound of lead with a solution containing arsenic in the presence of a sulfonated compound of an aromatic hydrocarbon.

2. The method of making lead arsenate which consists in treating lead oxid with a solution containing arsenic in the presence of a sulfonated compound of an aromatic hydrocarbon.

3. The method of making lead arsenate which consists in treating lead oxid with arsenic acid in the presence of a sulfonated compound of an aromatic hydrocarbon.

4. The method of making lead arsenate which consists in treating lead oxid with arsenic acid in the presence of a sulfonated compound of naphthalene.

5. The method of making lead arsenate which consists in treating an insoluble compound of lead with arsenic acid in the presence of a sulfonated compound of an aromatic hydrocarbon.

6. The method of making lead arsenate which consists in treating an insoluble compound of lead with arsenic acid in the presence of a sulfonated compound of naphthalene.

7. The method of making lead arsenate which consists in treating an insoluble compound of lead with a solution containing arsenic in the presence of a sulfonated compound of naphthalene.

8. The method of making lead arsenate which consists in treating lead oxid with a solution containing arsenic in the presence of a sulfonated compound of naphthalene.

9. The method of making lead arsenate which consists in treating an insoluble compound containing lead and oxygen with a solution containing arsenic in the presence of a sulfonated compound of an aromatic hydrocarbon.

10. The method of making lead arsenate which consists in treating an insoluble substance containing lead and oxygen with arsenic acid in the presence of a sulfonated compound of an aromatic hydrocarbon.

11. The method of making lead arsenate which consists in treating an insoluble substance containing lead and oxygen with arsenic acid in the presence of a sulfonated compound of naphthalene.

12. The method of making lead arsenate which consists in treating an insoluble substance containing lead and oxygen with a solution containing arsenic in the presence of a sulfonated compound of naphthalene.

In testimony whereof, we have hereunto affixed our signatures.

JOHN KIRBY.
MATT. S. HOPKINS.
C. BAKER BERNHART.